(12) United States Patent
Telehowski et al.

(10) Patent No.: US 6,926,351 B2
(45) Date of Patent: Aug. 9, 2005

(54) CONVERTIBLE VEHICLE UNI-BODY HAVING AND INTERNAL SUPPLEMENTAL SUPPORT STRUCTURE

(75) Inventors: Stephen G Telehowski, Novi, MI (US); Daniel W Atkinson, Royal Oak, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 53 days.

(21) Appl. No.: 10/765,259

(22) Filed: Jan. 26, 2004

(65) Prior Publication Data

US 2005/0057077 A1 Mar. 17, 2005

Related U.S. Application Data

(60) Provisional application No. 60/503,645, filed on Sep. 17, 2003.

(51) Int. Cl.[7] .................................................. B60J 7/00
(52) U.S. Cl. ........................... 296/203.03; 296/203.01; 296/193.04
(58) Field of Search ............................. 296/203.03, 29, 296/193.05, 193.07, 192, 204, 205, 203.01, 296/193.01, 193.03, 193.04

(56) References Cited

U.S. PATENT DOCUMENTS

| | | | | |
|---|---|---|---|---|
| 3,021,172 A | * | 2/1962 | Fiala et al. ............ | 296/203.01 |
| 4,045,075 A | * | 8/1977 | Pulver ..................... | 296/205 |
| 5,480,208 A | * | 1/1996 | Cobes et al. ........... | 296/203.03 |
| 5,860,694 A | * | 1/1999 | Seefried et al. ........ | 296/203.03 |
| 6,073,991 A | * | 6/2000 | Naert ..................... | 296/203.01 |
| 6,276,477 B1 | * | 8/2001 | Ida ......................... | 296/193.04 |
| 6,386,625 B1 | * | 5/2002 | Dukat et al. ........... | 296/203.03 |
| 6,666,500 B2 | * | 12/2003 | Polzer et al. .......... | 296/193.05 |
| 6,682,129 B2 | * | 1/2004 | Baggett et al. ......... | 296/204 |
| 6,729,681 B2 | * | 5/2004 | Yustick .................. | 296/203.02 |

FOREIGN PATENT DOCUMENTS

| | | | |
|---|---|---|---|
| EP | 622289 | * | 4/1994 |
| JP | 04143174 | * | 5/1992 |
| JP | 04215569 | * | 8/1992 |
| JP | 05170150 | * | 7/1993 |

* cited by examiner

Primary Examiner—Kiran B. Patel
(74) Attorney, Agent, or Firm—Ralph E. Smith

(57) ABSTRACT

A vehicle body includes an underbody having one or more underbody bolting flanges attached thereto, with each underbody bolting flange being adapted for bolted attachment to a mating bodyside bolting flange. Left and right bodyside subassemblies are joined to the underbody, with each bodyside including a supplemental bodyside support structure having attached thereto one or more bodyside bolting flanges, with each bodyside bolting flange being adapted for bolted attachment to one of the underbody bolting flanges after the bodyside subassemblies are otherwise joined to the underbody. The underbody bolting flanges are attached to supplemental crossmembers that are attached to and extend across the underbody.

10 Claims, 8 Drawing Sheets

CONVERTIBLE VEHICLE UNI-BODY HAVING AND INTERNAL SUPPLEMENTAL SUPPORT STRUCTURE

This application claims the benefit of U.S. Provisional Application Ser. No. 60/503,645, filed Sep. 17, 2003.

TECHNICAL FIELD OF THE INVENTION

This invention relates to vehicles having a body-in-white in the form of a uni-body, and more particularly providing a uni-body, body-in-white, having an internal supplemental support structure that can be assembled into the uni-body on a conventional uni-body assembly line with common manufacturing techniques.

BACKGROUND OF THE INVENTION

The backbone of vehicles such as automobiles, light trucks, vans, and recreation vehicles is a structure known in the automotive industry as a body-in-white. The body-in-white (BIW) is the skeletal structure or shell to which various subsystems are subsequently attached. These subsystems may include an engine and drive train, suspension and wheels, interior trim and seating components, and exterior ornamentation.

In the BIW of many modern vehicles, numerous structural and non-structural panels are joined together, to form a self-supporting, unitary, structural shell known as a uni-body. The uni-body eliminates the need for having a separate structural frame, as is required in traditional body-on-frame construction.

Uni-body construction is well suited to the BIW of a vehicle having a hard-top roof structure, such as a sedan or a coupe. In such a vehicle, the roof provides a substantial portion of the structural strength and stiffness of the uni-body that is available for joining the engine and suspension components at the front of the vehicle to the rear suspension.

In vehicles such as convertibles or roadsters, however, having a soft-top or no top, or in vehicles where a significant portion of the top is removable, the remaining portion of the uni-body must include sufficient additional structure to provide a uni-body that is strong enough and stiff enough to withstand the static and dynamic loads incident with operation of the vehicle. In the BIW of such vehicles, the number and material gage of the individual components of the uni-body must often be more than doubled in certain critical areas to achieve the required structural strength and stiffness of the uni-body. Adding these components, and increasing the material thickness, undesirably increases the cost, weight and complexity of the uni-body BIW of the vehicle, and can require that the assembly procedures on an assembly line be altered considerably for accommodating vehicles without hard-top roof structures.

What is needed is an improved architecture and method for producing a uni-body, body-in-white, providing the additional structural strength and stiffness required in certain types of vehicles, such as convertibles, roadsters, and vehicles where a significant portion of an otherwise hard-top roof are removable, that can be assembled on a conventional uni-body assembly line with common manufacturing techniques.

SUMMARY OF THE INVENTION

Our invention provides an improved uni-body, body-in-white, for a vehicle and a method for producing such an improved vehicle body, meeting the requirements discussed above, through use of a supplemental support structure, that is attached to an underbody and the bodyside of a vehicle body, prior joining the bodyside to the underbody. The supplemental support structure has bolted joints that are completed after the bodyside is joined to the underbody by conventional techniques, such as spot welding, so that a vehicle body including the supplemental support structure can be assembled on the same assembly line as other vehicle bodies that do not include the supplemental support structure, with little or no change in the assembly sequence for the vehicle body.

In one form of our invention, a vehicle body includes an underbody and a bodyside joined to the underbody. The underbody includes one or more underbody bolting flanges attached thereto, with each underbody bolting flange being adapted for bolted attachment to a mating bodyside bolting flange. The bodyside includes a supplemental bodyside support structure having attached thereto one or more bodyside bolting flanges, with each bodyside bolting flange being adapted for bolted attachment to one of the underbody bolting flanges.

The bodyside may include a bodyside subassembly, with the supplemental bodyside support structure including tabs extending therefrom for attaching the supplemental bodyside support structure to the bodyside subassembly. Where the bodyside includes a bodyside subassembly comprising a sill joining a forward standing pillar to an aft standing pillar, the forward and aft standing pillars both extending upward from the sill, and a quarter panel extending from the aft pillar toward the rear end of the vehicle body, the supplemental bodyside support structure may include a supplemental sill member joining a forward supplemental pillar member to an aft supplemental pillar member, the forward and aft supplemental pillar members extending upward from the supplemental sill member, and a quarter panel supplemental support member extending along the quarter panel from the aft supplemental pillar member of the supplemental bodyside support structure toward the rear end of the vehicle body.

The underbody of a vehicle body, according to our invention, may include one or more supplemental underbody crossmembers having an underbody bolting flange attached thereto. One or more of the supplemental underbody crossmembers may include tabs extending therefrom for attaching the supplemental crossmember to the underbody.

In a vehicle body for a convertible, wherein the bodyside includes a bodyside subassembly comprising a sill joining a hinge pillar to a B-pillar, an A-pillar extending upward from the hinge pillar, and a quarter panel defining a beltline extending from the B-pillar to a D-pillar area defined by the quarter panel, the supplemental bodyside support structure may include a sill member joining a hinge pillar member to a B-pillar member, an A-pillar member extending upward from the hinge pillar member, and a quarter panel member extending along the beltline from the B-pillar member of the supplemental bodyside support structure to the D-pillar area. Where the underbody of the vehicle body for the convertible includes a dash subassembly, a kick-up subassembly, and a rear seat bulkhead subassembly, a vehicle body according to our invention may include a dash supplemental crossmember attached to the dash subassembly, a kick-up supplemental cross member attached to the kick-up subassembly, and a rear seat bulkhead supplemental crossmember attached to the rear seat bulkhead.

The supplemental bodyside support structure, and supplemental crossmembers of a vehicle body according to our invention may be fabricated as simple, light weight and inexpensive generally tubular structures, and be placed in locations that are both completely hidden by final trim of the vehicle and do not interfere with or require changing the location or configuration of any other subsystem attached to vehicle body.

Our invention may also take the form of a method for producing a vehicle body, according to our invention, as described above or in the subsequent detailed description.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

DETAILED DESCRIPTION

Figure 1:
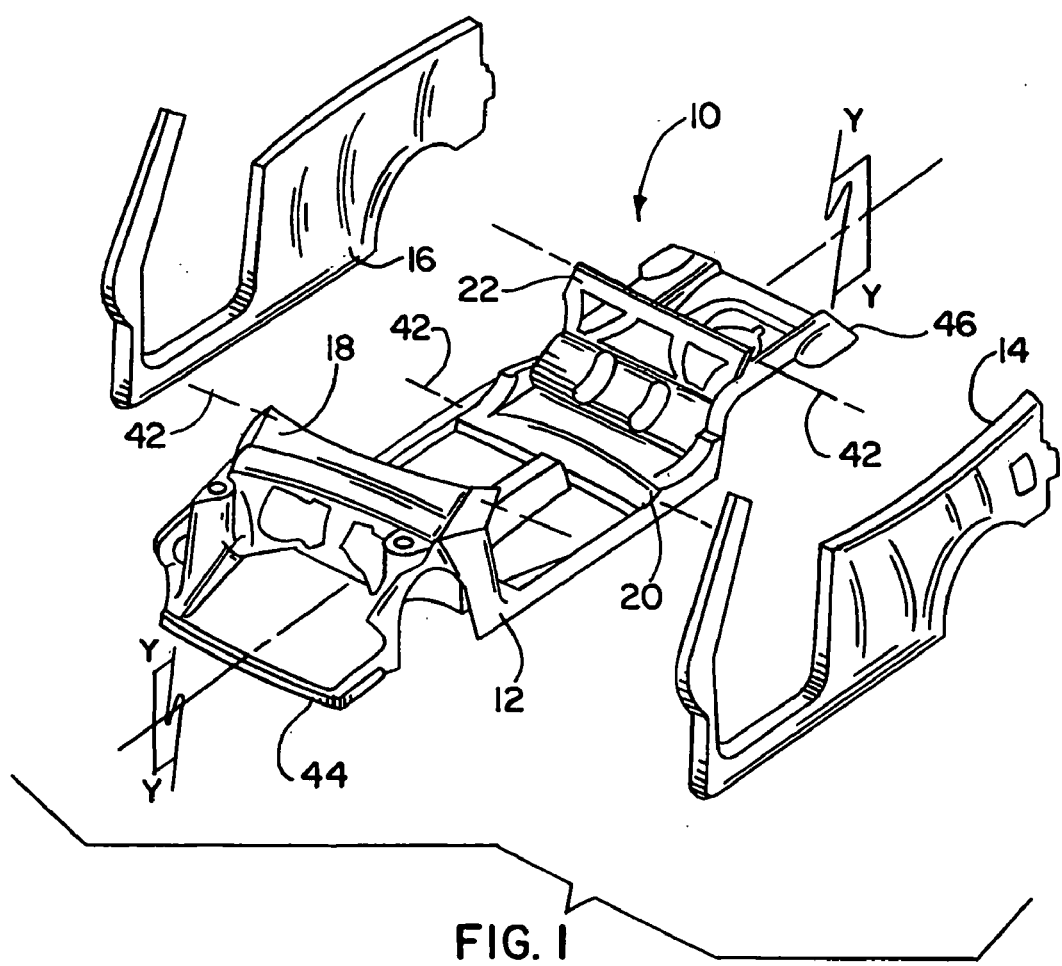
FIG. 1 is perspective representation of a vehicle body, according to our invention.

FIG. 1 is an exploded perspective view of pertinent portions of a vehicle body 10 for a convertible vehicle, fabricated as a uni-body, body-in-white (BIW). The vehicle body 10 includes an underbody 12, a left bodyside subassembly 14, and a right bodyside subassembly 16. The underbody 12 includes a dash subassembly 18, a kick-up subassembly 20, and a rear seat bulkhead subassembly 22. In a typical assembly procedure on an assembly line, the underbody 12 and the left and right bodyside subassemblies 14, 16 are brought together, positioned relative to one another, and joined by spot welding the bodyside subassemblies 14, 16 to the underbody 12 at a number of points along various junctures between the bodyside subassemblies 14, 16 and the underbody 12.

Figure 2:
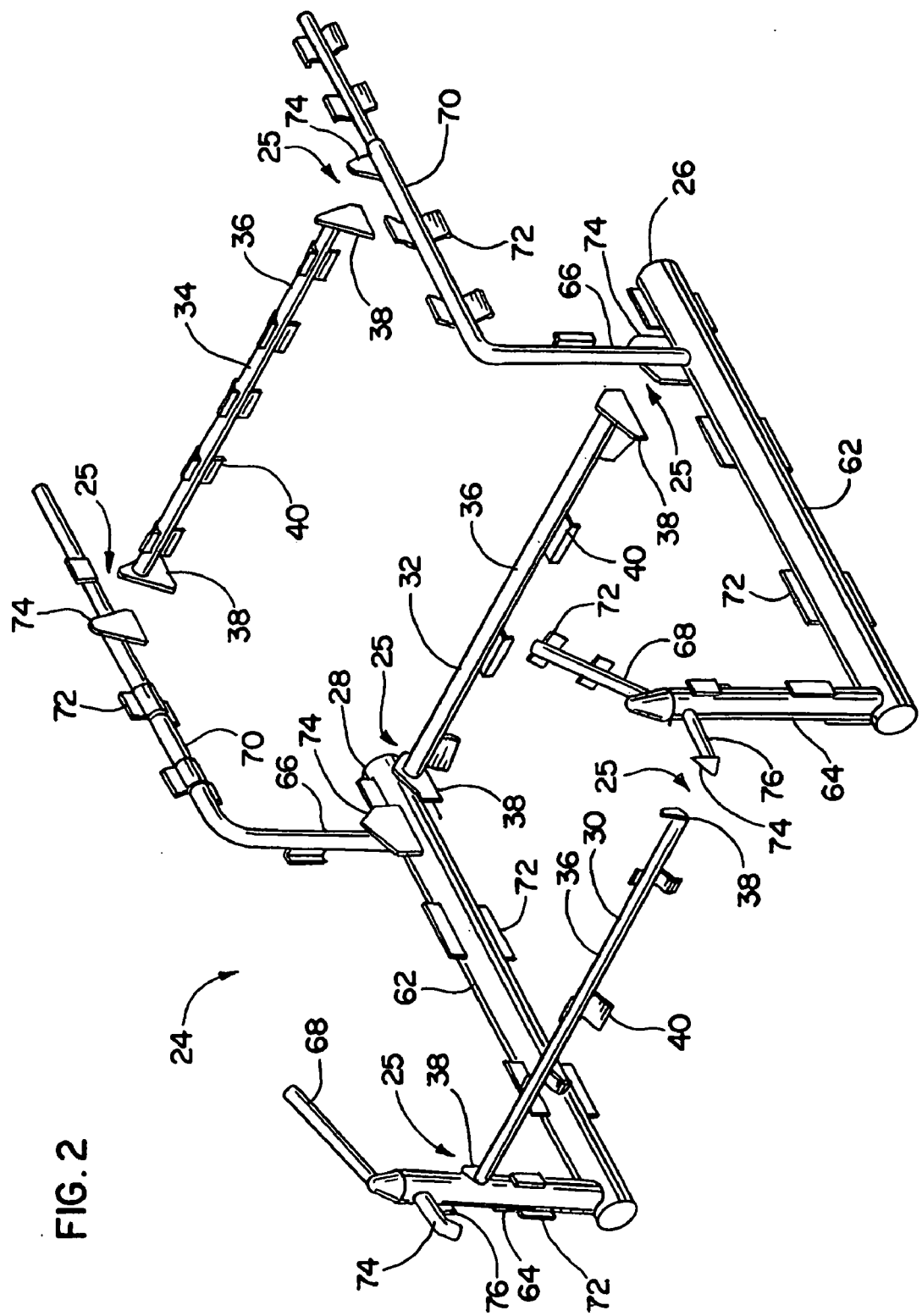
FIG. 2 is a perspective representation of a supplemental support structure that is incorporated into the vehicle body of FIG. 1.

FIGS. 2–10 collectively show various aspects of an exemplary embodiment of our invention in which a supplemental body support structure 24, as shown in FIG. 2, is incorporated into the vehicle body 10 of FIG. 1, to provide an improved vehicle body 10, according to our invention.

As shown in FIG. 2, the supplemental body support structure 24 includes left and right supplemental bodyside support structures 26, 28, that are joined by bolted connections 25, as described in more detail below, to a dash supplemental crossmember 30, a kick-up supplemental crossmember 32, and a rear seat bulkhead supplemental crossmember 34.

As shown in FIGS. 2 and 3–5, the supplemental crossmembers 30, 32, 34 each include an elongated central element 36, and an underbody bolting flange 38 attached to each end of the central section 36. It is anticipated that it will generally be preferable to fabricate the central section 36 of the crossmembers 30–34 from a straight length of tubing, having a relatively thin wall, and fabricate the underbody bolting flanges 38 from plate material having a substantial thickness, on the order of ¼ inch for bolting flanges 38 made of mild steel, for example. In some embodiments of our invention, however, it may be desirable to use non-tubular and non-straight material for forming the central section 36 of one or more of the supplemental crossmembers 30–34.

Figure 3:
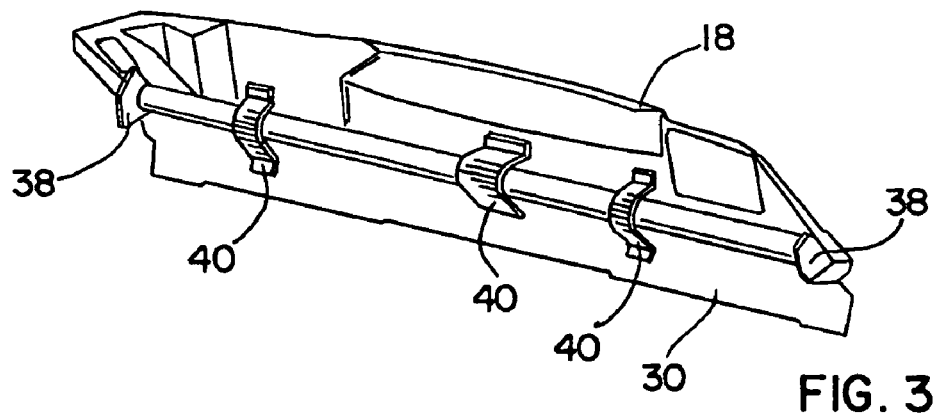
FIGS. 3–5 are perspective views showing supplemental crossmembers of FIG. 2 attached to various components of the vehicle body of FIG. 1.
Figure 4:
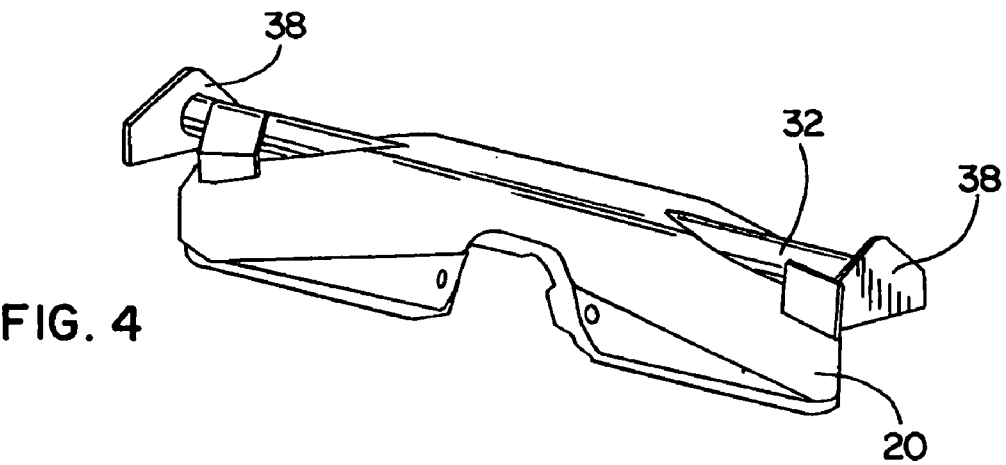
Figure 5:
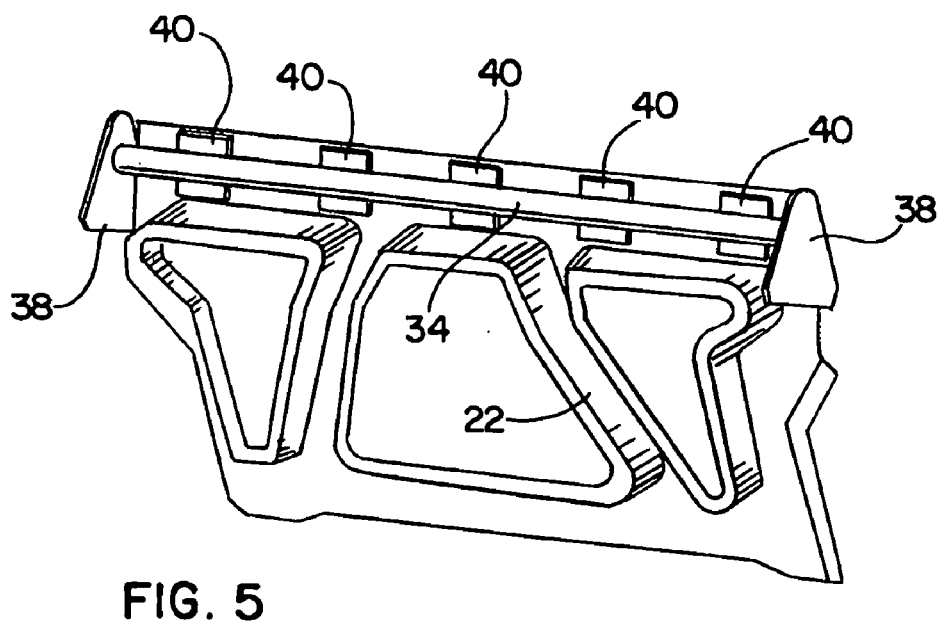
Figure 6:
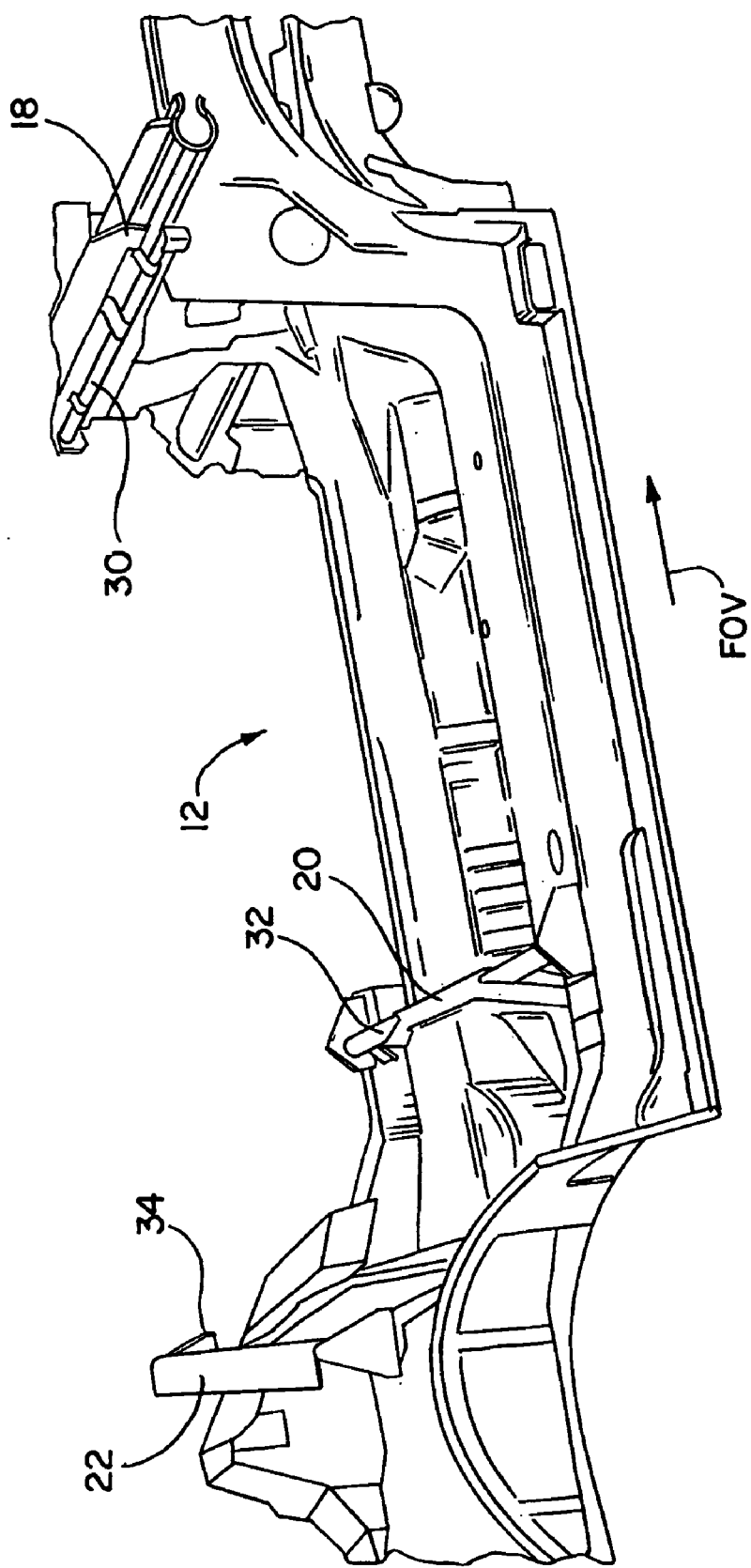
FIGS. 6–8 are perspective views of an underbody of the vehicle body of FIG. 1, showing the crossmembers and components of FIGS. 3–5 attached to the remainder of the underbody.
Figure 7:
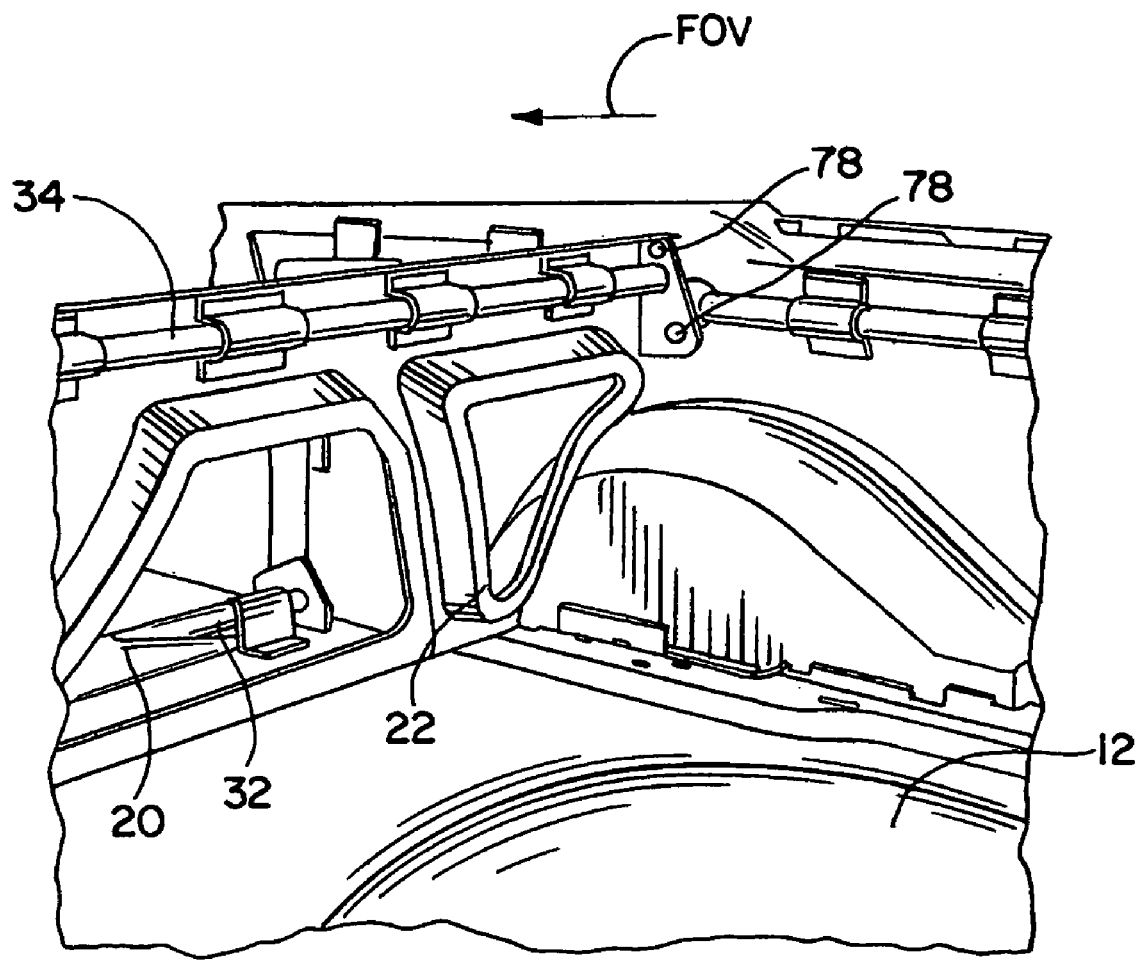
Figure 8:
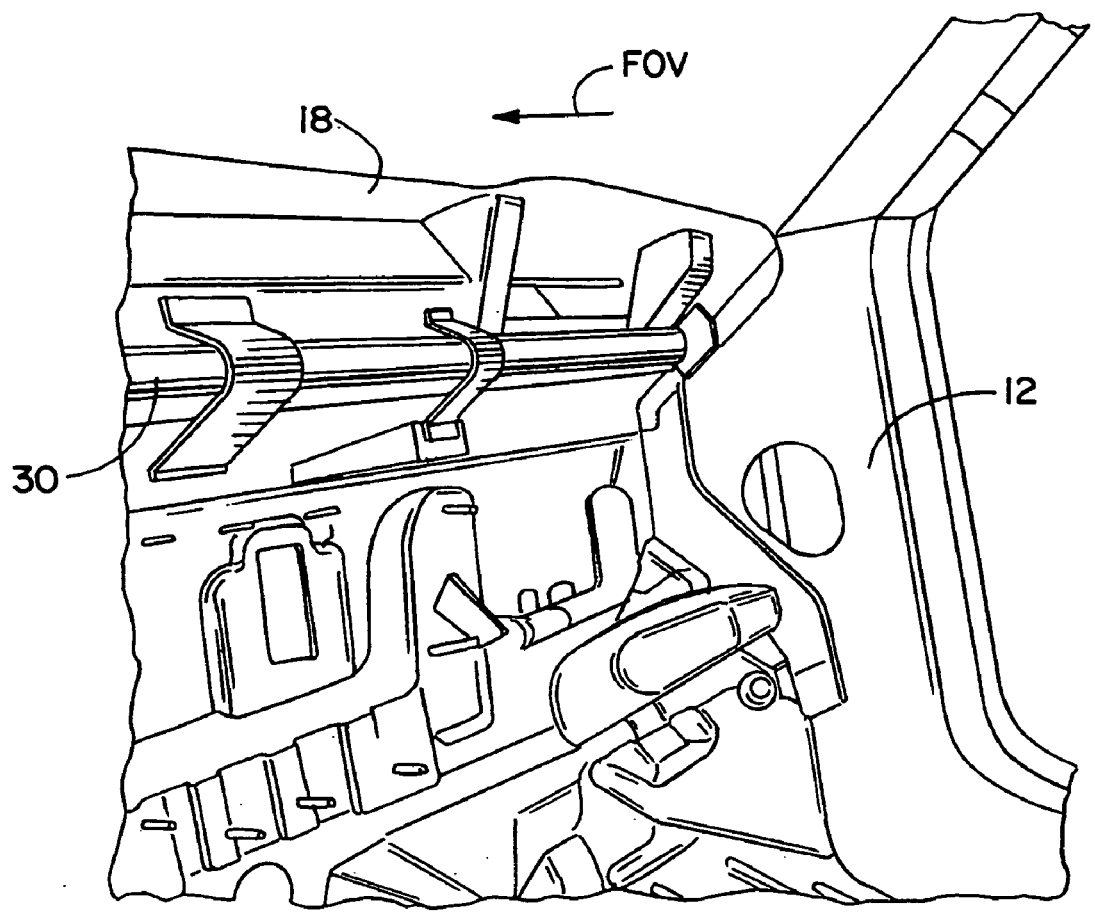

The supplemental crossmembers 30–34 also include a number of tabs 40 extending from the central sections 36 of the supplemental crossmembers 30–34, for attaching the dash, kick-up, and rear seat bulkhead supplemental crossmembers 30–34, respectively, to the dash, kick-up, and rear seat bulkhead subassemblies 18, 20, 22, as shown in FIGS. 3 through 5, by spot welding the tabs 40 on the dash, kick-up, and rear seat bulkhead supplemental crossmembers 30–34, respectively, to the dash, kick-up, and rear seat bulkhead subassemblies 18, 20, 22. The dash, kick-up, and rear seat bulkhead subassemblies 18, 20, 22, with the dash, kick-up, and rear seat bulkhead supplemental crossmembers 30–34, respectively attached thereto, are then assembled into the underbody 12, as shown in FIGS. 6 through 8.

As described above the supplemental crossmembers 30–34 of the exemplary embodiment include a central section 36 formed from a straight length of material. As shown, in FIG. 1, the vehicle body 10 defines a central longitudinal plane Y—Y extending from the front end 44 to the rear end 46 of the vehicle body 10, and three transverse axes 42 extending transversely across the underbody 12, in a direction perpendicular to the central longitudinal plane Y—Y. The straight central sections 36 of the crossmembers 30–34 in the exemplary embodiment of the vehicle body 10 are attached to the underbody with central sections 36 of the supplemental crossmembers 30–34 aligned with the transverse axes 42, to extend transversely across the underbody 12, in a direction perpendicular to the central longitudinal plane Y—Y extending from the front end 44 to the rear end 46 of the vehicle body 10.

Figure 9:
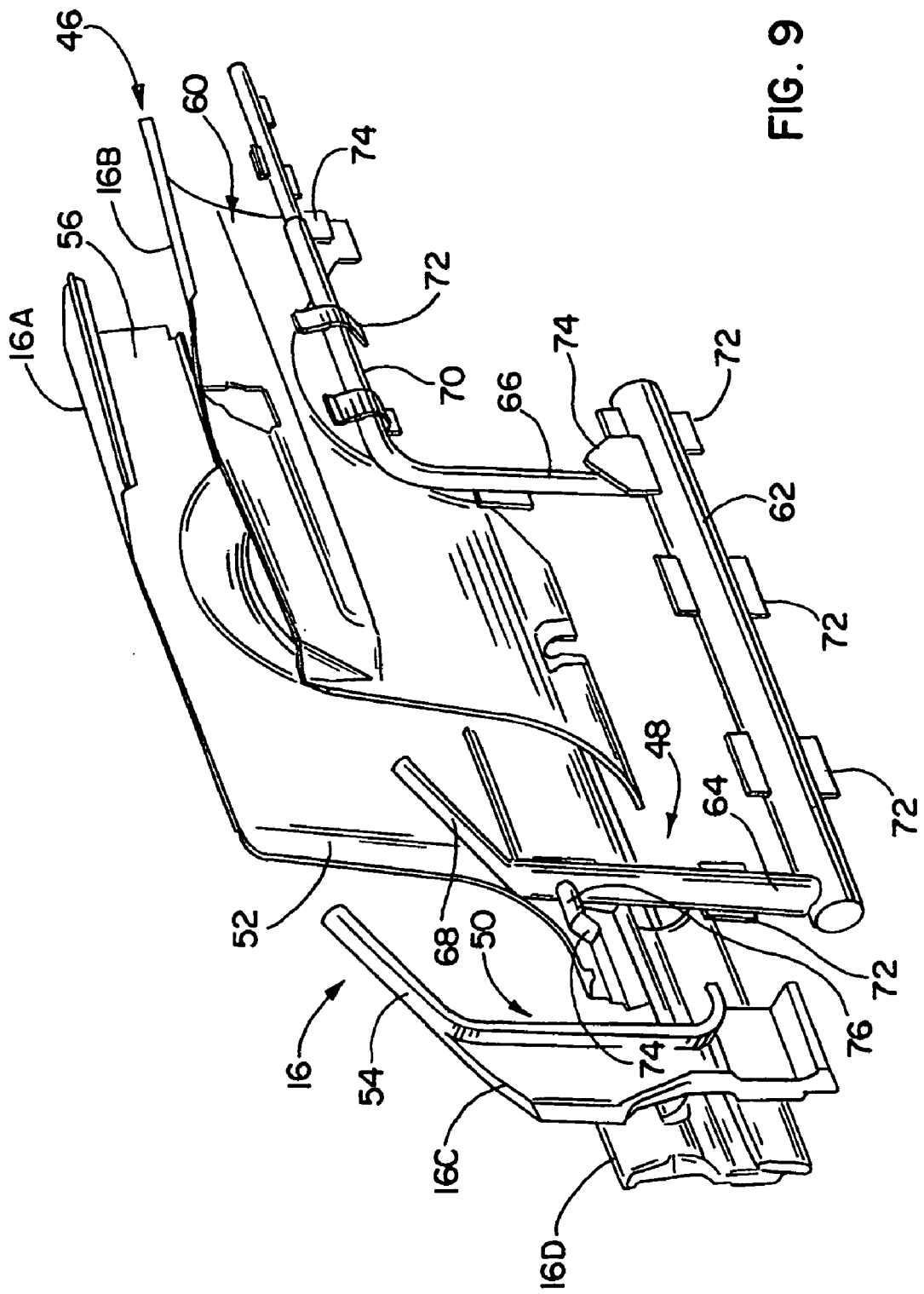
FIGS. 9 and 10 are a perspective views showing various aspects of a bodyside subassembly and a supplemental bodyside support structure, according to our invention.

The left and right bodyside subassemblies 14, 16 are each fabricated from four separate sheet metal components. FIG. 9 shows the four components 16A–16D that are joined together to form the right bodyside subassembly 16 shown in FIG. 10. The left bodyside subassembly 14 is constructed in similar fashion.

Figure 10:
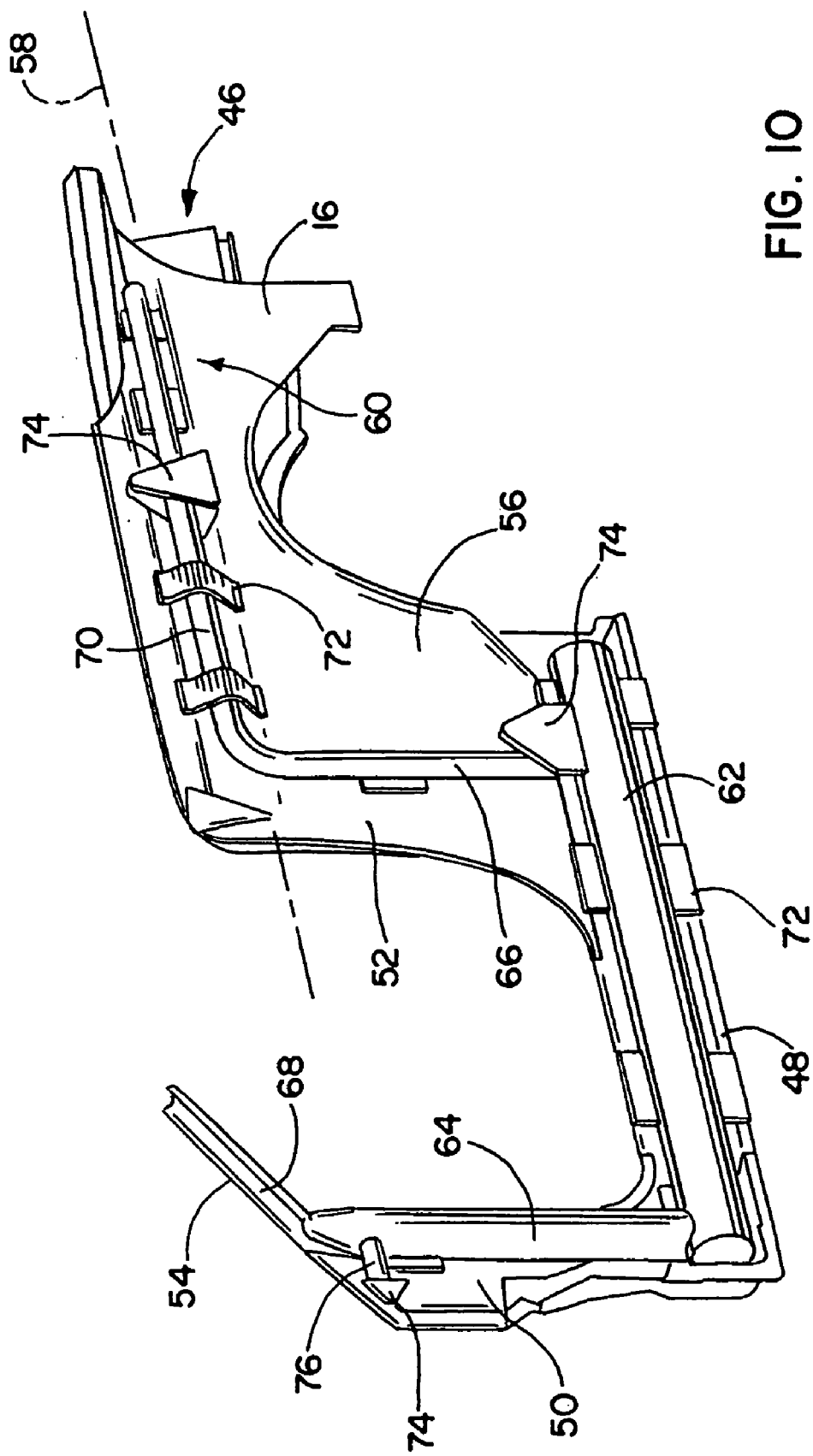

As shown in FIGS. 9 and 10, the bodyside subassemblies, 14, 16, (of which only the right bodyside subassembly 16 is shown) each include a sill 48 joining a forward standing pillar, in the form or a hinge pillar 50, to an aft standing pillar, in the form of a B-pillar 52. An A-pillar 54 extends upward from the hinge pillar 50. A quarter panel 56 of the bodyside subassemblies 14, defines a beltline, generally indicated at 58, extending toward the rear end 46 of the vehicle body 10 from the B-pillar 52, to a D-pillar area, generally indicated at 60.

The terms A-pillar, B-pillar, and D-pillar area are used herein in their customary sense to signify the general location of a standing pillar with respect to the front end 44 of the vehicle body 10, or the area of the bodyside subassemblies 14, 16 that would be associated with the general location of four standing pillars designated A through D, starting from the windshield, on a vehicle, such as a typical station wagon, that would normally include four standing pillars for supporting a hard-top roof structure.

As shown in FIGS. 2, 9 and 10, the left and right supplemental bodyside support structures 26, 28 each include a sill member 62 joining a forward standing pillar member, in the form of a hinge pillar member 64, to an aft standing pillar, in the form of a B-pillar member 66. An A-pillar member 68 extends upward from the hinge pillar member 64, and a quarter panel member 70 extends along the beltline 58 from the B-pillar member 66 of each of the supplemental bodyside support structure 26, 28 to the D-pillar area 60. The supplemental bodyside support structures 26, 28 each also include a number of tabs 72, extending from the supplemental bodyside support structures 26, 28, as shown in FIGS. 2, 9 and 10, for attaching the left and right supplemental bodyside support structures 26, 28, respectively, to the left and right bodyside subassemblies 14, 16, as shown in FIG. 10, by a process such as spot welding.

The supplemental bodyside support structures 26, 28 each also include three bodyside bolting flanges 74 positioned for mating engagement with the underbody bolting flanges 38 of the three supplemental crossmembers 30–34. The bodyside bolting flanges 74 adapted to mate with the underbody bolting plate on the dash subassembly 18, are each mounted on the distal end of a short arm 76 cantilevered from the hinge pillars 64 of the left and right supplemental bodyside support structures 26, 28.

It is anticipated that it will generally be preferable to fabricate the central supplemental bodyside support structures 26, 28 from tubing, having a relatively thin wall, and to fabricate the bodyside bolting flanges 74 from plate material having a substantial thickness, on the order of ¼ inch for bolting flanges 74 made of mild steel, for example. In some embodiments of our invention, however, it may be desirable to use thick-wall tubing, or non-tubular, solid material for forming part or all of the supplemental bodyside support structures 26, 28.

It is also anticipated that the underbody and bodyside bolting flanges 38, 74 incorporate oversized holes for receiving bolts 78, as shown in FIG. 7, for integrally attaching the supplemental bodyside support structures 26, 28 to the supplemental crossmembers 30–34, after the bodyside subassemblies 14, 16, are joined, by spot welding for example, to the underbody 12. The oversized holes allow the bodyside assemblies 14, 16 to be precisely positioned with respect to the underbody 12 for welding operations, and still allow the bolts 78 to be inserted through the holes despite any misalignment of the holes that may exist after the bodyside subassemblies 14, 16 are spot welded, or otherwise joined to the underbody 12.

It is further anticipated that mating pairs of underbody and bodyside bolting flanges 38, 74 be configured to mate along faying surfaces that lie in an offset plane extending parallel to the central longitudinal plane Y—Y. Preferably, all of the bolting flanges 38, 74 on each side of the vehicle body 10 would be configured to mate along the same offset plane. By having all of the bolting flanges mate in this fashion, the bolting plates 38, 74 can be used for setting the cross-car position of the bodyside subassemblies 14, 16, and to facilitate positioning the bodyside subassemblies 14, 16 in the proper location along, and up and down with respect to, the underbody 12, for joining of the bodyside subassemblies 14, 16 to the underbody 12.

The bodyside bolting flanges 74 and underbody bolting flanges 38 are preferably configured and located so that the bolts 78 can be installed after the bodysides 14, 16 are joined to the underbody 12. The completed vehicle body 10 may be painted either prior to, or after bolting the bodyside bolting flanges 74 to the underbody bolting flanges 38, to minimize changes in assembly line procedures required for implementing our invention.

Those having skill in the art will recognize that a vehicle body 10, and the method of our invention provide significant advantages over the prior art. A vehicle body 10 according to our invention can be constructed from fewer parts, than previous bodies 10 suitable for use in vehicles such as convertibles that need to have additional strength and stiffness added to a uni-body, and can be built on an assembly line used for other types of vehicle bodies with little of no modification to the assembly line configuration and procedures. A supplemental support structure 24, according to our invention may also be inobtrusively incorporated into a vehicle body 10 below existing interior trim, and without interference with other subsystems attached to the vehicle body 10.

Those skilled in the art will also readily recognize that, while the embodiments of our invention disclosed herein are presently considered to be preferred, various changes and modifications can be made without departing from the spirit and scope of the invention. For example, our invention may be used with fewer of more supplemental crossmembers than are shown in the exemplary embodiment, and crossmembers located in positions other than those indicated for the exemplary embodiment. Our invention may be used in vehicles other than convertibles, and in vehicles having additional standing pillars between the forward and aft standing pillars. Our invention may be used in vehicles having hard-top roof structures. The sequence of assembling the various parts, described above in relation to the exemplary embodiment, may also be changed significantly, to meet the needs of various assembly line operations, for assembling more or less of a vehicle body during the joining operation, or in a series of sub-assembly operations that may be performed remotely from a main assembly line.

We also contemplate that a supplemental support structure according to our invention can be configured to mate with various types of roll bars, or to function as a factory installed roll cage. In such applications, we contemplate that it may be desirable to have some portion of the supplemental support structure exposed outside of the interior trim of the vehicle. We also contemplate, however, that a supplemental support structure, according to our invention, configured as a factory installed roll cage, could be entirely hidden beneath the interior trim of a vehicle.

The scope of the invention is indicated in the appended claims, and all changes or modifications within the meaning and range of equivalents are intended to be embraced therein.

We claim:

1. A vehicle body, comprising:
   an underbody having one or more underbody bolting flanges attached thereto, with each underbody bolting flange being adapted for bolted attachment to a mating bodyside bolting flange; and
   a bodyside attached to the underbody, the bodyside including a supplemental bodyside support structure having attached thereto one or more bodyside bolting flanges, with each bodyside bolting flange being adapted for bolted attachment to one of the underbody bolting flanges.

2. The vehicle body claim 1, further comprising one or more bolts attaching each of the underbody bolting flanges to a mating bodyside bolting flange.

3. The vehicle body of claim 1, wherein:
   the vehicle body includes a front and a rear end thereof and defines a vertically oriented central plane extending longitudinally along the body from the front to the rear ends thereof, and one or more offset planes extending parallel to the central plane; and the underside bolting flanges and the bodyside bolting flanges are adapted for mating with one another along one or more of the one or more offset planes.

4. The vehicle body of claim 1 wherein:

the bodyside includes a bodyside subassembly; and the supplemental bodyside support structure includes tabs extending therefrom for attaching the supplemental bodyside support structure to the bodyside subassembly.

5. The vehicle body of claim 1 wherein:

the bodyside includes a bodyside subassembly comprising a sill joining a forward standing pillar to an aft standing pillar, the forward and aft standing pillars both extending upward from the sill, and a quarter panel extending from the aft pillar toward the rear end of the vehicle body; and the supplemental bodyside support structure includes a supplemental sill member joining a forward supplemental pillar member to an aft supplemental pillar member, the forward and aft supplemental pillar members extending upward from the supplemental sill member, and a quarter panel supplemental support member extending along the quarter panel from the aft supplemental pillar member of the supplemental bodyside support structure toward the rear end of the vehicle body.

6. The vehicle body of claim 1 wherein:

the bodyside includes a bodyside subassembly comprising a sill joining a hinge pillar to a B-pillar, an A-pillar extending upward from the hinge pillar, and a quarter panel defining a beltline extending from the B-pillar to a D-pillar area defined by the quarter panel; and the supplemental bodyside support structure includes a sill member joining a hinge pillar member to a B-pillar member, a A-pillar member extending upward from the hinge pillar member, and a quarter panel member extending along the beltline from the B-pillar member of the supplemental bodyside support structure to the D-pillar area.

7. The vehicle body of claim 1 wherein the underbody includes one or more supplemental underbody crossmembers each having an underbody bolting flange attached thereto.

8. The vehicle body of claim 7 wherein the supplemental bodyside crossmember includes tabs extending therefrom for attaching the supplemental crossmember to the underbody.

9. The vehicle body of claim 7 wherein:

the underbody defines a transverse axis extending transversely across the underbody, and the vehicle body further comprises:

one or more of the one or more supplemental crossmembers is formed from a straight length of material; and the supplemental crossmember is attached to the underbody with the supplemental crossmember aligned with a transverse axis extending transversely across the underbody.

10. The method of claim 7 wherein the underbody includes a dash subassembly, a kick-up subassembly, and a rear seat bulkhead subassembly, a dash supplemental crossmember attached to the dash subassembly, a kick-up supplemental cross member attached to the kick-up subassembly, and a rear seat bulkhead supplemental crossmember attached to the rear seat bulkhead.

* * * * *

UNITED STATES PATENT AND TRADEMARK OFFICE
CERTIFICATE OF CORRECTION

PATENT NO. : 6,926,351 B2
DATED : August 9, 2005
INVENTOR(S) : Telehowski et al.

It is certified that error appears in the above-identified patent and that said Letters Patent is hereby corrected as shown below:

Title page,
Item [54], Title, "CONVERTIBLE VEHICLE UNI-BODY HAVING AND INTERNAL SUPPLEMENTAL SUPPORT STRUCTURE" should read
-- CONVERTIBLE VEHICLE UNI-BODY HAVING AN INTERNAL SUPPLEMENTAL SUPPORT STRUCTURE --.

Signed and Sealed this

First Day of November, 2005

JON W. DUDAS
*Director of the United States Patent and Trademark Office*